United States Patent [19]

Nagaoka et al.

[11] Patent Number: 4,868,688
[45] Date of Patent: Sep. 19, 1989

[54] ELONGATED STRIP STORAGE APPARATUS AND RECORDER TAPE DUPLICATOR SYSTEM UTILIZING ENDLESS TAPE STORED IN STORAGE APPARATUS

[75] Inventors: Kazuo Nagaoka, Yokohama; Yoshiki Takao, Chigasaki; Masato Yamamoto, Zama, all of Japan

[73] Assignee: Sony Magnescale Inc., Tokyo, Japan

[21] Appl. No.: 113,737

[22] Filed: Oct. 28, 1987

[30] Foreign Application Priority Data

Oct. 31, 1986 [JP] Japan ................... 61-259916
Oct. 31, 1986 [JP] Japan ................... 61-259917
Jun. 4, 1987 [JP] Japan ................... 62-140690

[51] Int. Cl.$^4$ .................... G11B 5/86; B65H 20/24
[52] U.S. Cl. ........................ 360/16; 226/118
[58] Field of Search ................ 360/93, 95, 16; 226/118, 119; 242/179

[56] References Cited

U.S. PATENT DOCUMENTS

| | | | |
|---|---|---|---|
| 4,236,391 | 12/1980 | Stobi | 226/118 |
| 4,373,362 | 2/1983 | Fleissner | 226/118 |
| 4,387,843 | 6/1983 | Rehklau | 226/118 |
| 4,589,580 | 5/1986 | Young, Jr. et al. | 226/119 |

Primary Examiner—Vincent P. Canney
Attorney, Agent, or Firm—Ronald P. Kananen

[57] ABSTRACT

An endless elongated strip storage apparatus includes a casing which defines a strip storage space. The casing has at least one peripheral wall which is oscillatable. Oscillation of the oscillatable wall contains a component in a tape feeding direction. The storage means includes means for exerting a force on the elongated strip including a component direction to the tape feeding direction for transferring the elongated strip, such as tape. The oscillatable wall is cooperative with the force exerting means to smoothly feed the tape from the inlet of the casing to the outlet of the casing.

34 Claims, 8 Drawing Sheets

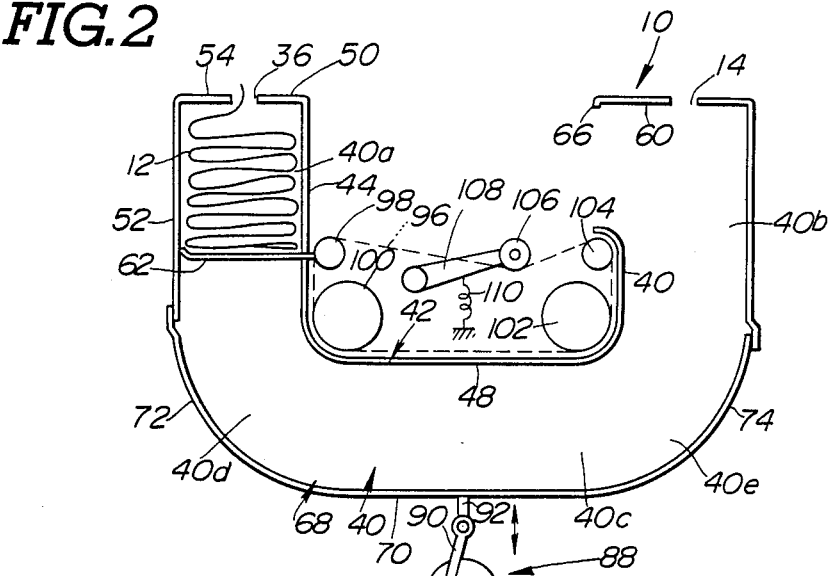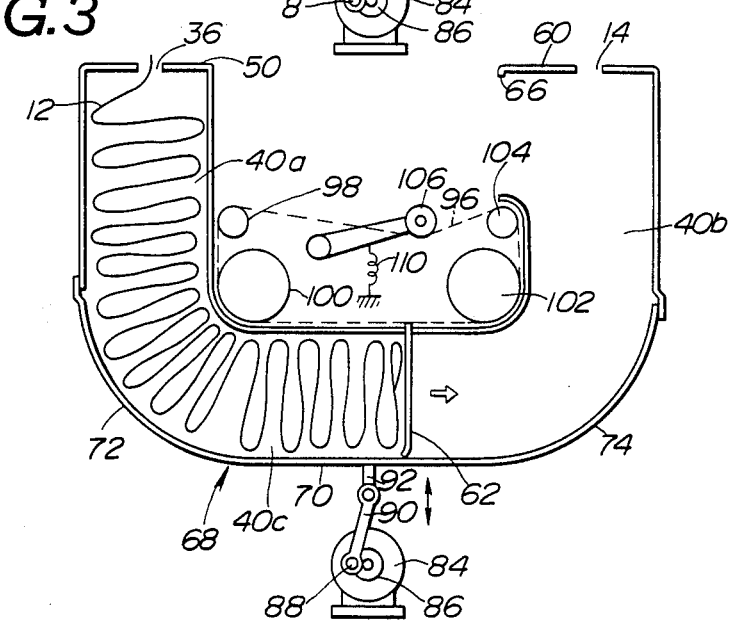

ELONGATED STRIP STORAGE APPARATUS AND RECORDER TAPE DUPLICATOR SYSTEM UTILIZING ENDLESS TAPE STORED IN STORAGE APPARATUS

BACKGROUND OF THE INVENTION

1. Field of the Invention

The present invention relates generally to a storage apparatus for storing an endless elongated strip, such as a magnetic tape and other recording medium. More specifically, the invention relates to an endless elongated strip storage apparatus which can smoothly feed the strip from inlet to outlet. The invention also relates to a recorded tape duplicator system which employs the aforementioned storage apparatus for storing an endless recorded tape.

2. Description of the Background Art

In the recent years, there have been developed high speed recorded tape duplicator systems utilizing an endless master tape. In such duplicator systems, it is essential to smoothly feed the endless master tape in order to enable a high speed duplicating operation. Also, smooth feeding of the endless tape is essential for preventing the master tape from breaking. For accomplishing a satisfactorily smooth feed of the tape through the duplicating system at high speed, the tape in the endless tape storage apparatus has to be smoothly transferred from inlet to the outlet. In the tape storage apparatus, the tape has to be regularly folded in a pleatlike fashion for preventing jamming in the apparatus. Furthermore, in case of a chromium coated tape, metal tape and so forth, heavy folding of the tape tends to form permanent wrinkles. Such excessively heavy folding of the tape tends to occur when tape is accumulated at bend in the tape path in the storage apparatus.

SUMMARY OF THE INVENTION

Therefore, it is an object of the present invention to provide a endless elongated strip storage means which can smoothly transfer the strip from the inlet to the outlet.

Another object of the invention is to provide a recorded tape duplicator system which employs an endless a tape stored in tape storage apparatus which is constructed according to the present invention.

In order to accomplish the aforementioned and other objects, an endless elongated strip storage apparatus, according to the invention, includes a casing which defines a strip storage space. The casing has at least one peripheral wall which is oscillatable. Oscillation of the oscillatable wall contains a component in a tape feeding direction. The storage means includes means for exerting a force on the elongated strip including a component direction to the tape feeding direction for transferring the elongated strip, such as tape. The oscillatable wall is cooperative with the force exerting means to smoothly feed the tape from the inlet of the casing to the outlet of the casing.

According to one aspect of the invention, a storage apparatus for an elongated strip comprises a casing defining a chamber for storing the elongated strip, the chamber extending between an inlet through which the elongated strip is introduced and an outlet through which the elongated strip is fed out, means for driving at least a part of the casing to oscillate, and means for exerting a feeding force on the elongated strip for transferring the elongated strip from the inlet to outlet.

According to another aspect of the invention, a tape duplicating system for duplicating information recorded on an endless form master tape to a continuously fed blank tape, comprises first means for defining a first path through which the master tape is circulated, second means for defining a second path through which the slave tape is fed, the second path including an information transfer section at which the slave tape mates with the master tape, third means, active at the information transfer section, for duplicating information recorded on the master tape to the slave tape, a tape storage apparatus disposed within the first path for storing an extra length of an endless master tape, which comprises a casing defining a chamber for storing the tape, the chamber extending between an inlet through which the tape is introduced and an outlet through which the tape is fed out, means for driving at least a part of the casing to oscillate, and means for exerting a feeding force on the tape for transferring the tape from the inlet to outlet.

With the constructions set forth above, the elongated strip or the endless tape can be transferred through the storage chamber smoothly without causing jamming in the storage chamber.

The chamber has a length substantially shorter than the length of the elongated strip or tape and designed for storing the extra length of elongated strip or tape in a folded fashion. In the practical construction, the casing defines the chamber including a first section oriented adjacent the inlet and for transferring the elongated strip or tape in a first direction parallel to the direction along which the elongated strip or tape is introduced, a second section oriented adjacent the outlet and for transferring the elongated strip or tape in a second direction parallel to the direction along which the elongated strip or tape is fed out, and a third section connecting the first and second section for transferring the elongated strip or tape from the first end adjacent the first section to the second end adjacent the second section, and the feeding energy exerting means is active for exerting feeding force on the elongated strip or tape in the third section in a third direction substantially along the third section for transferring the elongated strip or tape in the third section from the first end to the second end.

The casing is provided on a vertical plane, and the first transfer direction is vertically downward to transfer the elongated strip or tape vertically introduced through the inlet, the second transfer direction is vertically upward to upwardly feed out through the outlet and the third transfer direction is horizontal to transfer the elongated strip or tape from the first end to the second end in synchronism with a vibration cycle. Preferably, the casing has a oscillatable wall member constituting a bottom of the third section, the oscillatable wall member being designed to be driven for vibration to cause vertical shaking of the elongated strip or tape in the third section to cause movement from the first end to the second end in the aid of the gravity weight of the strip in the first section.

The storage apparatus may further comprise means, initially arranged in the chamber adjacent the inlet, for restricting movement of the elongated strip or tape upon initially setting the elongated strip or tape in the chamber, the elongated strip or tape movement restricting means being movable along the center axis of the chamber in synchronism with introduction of the elongated. strip or tape for folding the strip in the chamber in a pleated fashion. The elongated strip or tape movement restricting means is movable along the initial position to an end position where it is placed adjacent the outlet along the center axis of the chamber, the elongated strip or tape movement restricting means being associated with a driving means for movement in synchronism with introduction of the elongated strip or tape into the chamber. The elongated strip or tape movement restricting means comprises a plate member initially extending in perpendicular to the center axis of the chamber for restricting movement of the elongated strip or tape and being placed in parallel to the center axis of the chamber at the end position for allowing the elongated strip or tape to pass through the outlet.

In the alternative, the casing is placed on a horizontal place for defining the chamber extending on the horizontal plane, the first and second sections of the chamber are oriented in a parallel relationship to each other, and the third section extends substantially in perpendicular to the the first and second sections. The driving means driving the casing to exert vibration energy on the elongated strip or tape is directed in a direction oblique to the horizontal plane, the direction of the vibration energy being so selected as to include a horizontal component directed to feed the elongated strip or tape from the first end to the second end in the third section. In such preferred construction, the storage apparatus may further comprise means, provided adjacent the inlet and the outlet for discharging air toward the elongated the strip or tape for maintaining strip in straight orientation during travel through the first and second sections of the chamber. The elongated strip or tape forms an endless loop circulating through a predetermined external path and continuously drawn out through the outlet of the chamber and recirculated into the chamber through the inlet.

The feeding force exerting means converts the gravitational weight of the elongated strip in the first section into the feeding force for transferring the elongated strip in the third section from the first end to the second end. In the alternative, the feeding force exerting means converts vibration energy into a feeding force for transferring the elongated strip in the third section from the first end to the second end.

BRIEF DESCRIPTION OF THE DRAWINGS

The present invention will be understood more fully from the detailed description give herebelow and from the accompanying drawings of the preferred embodiment of the invention, which, however, should not taken to limit the invention to the specific embodiments, but are for explanation and understanding only.

In the drawings:

FIGS. 2, 3 and 4 show the preferred embodiment of the tape storage apparatus employed in the preferred embodiment of the recorded tape duplicator system of FIG. 1, which illustrate a process of initially setting the endless tape in the tape storage apparatus;

DESCRIPTION OF THE PREFERRED EMBODIMENT

Figure 1:
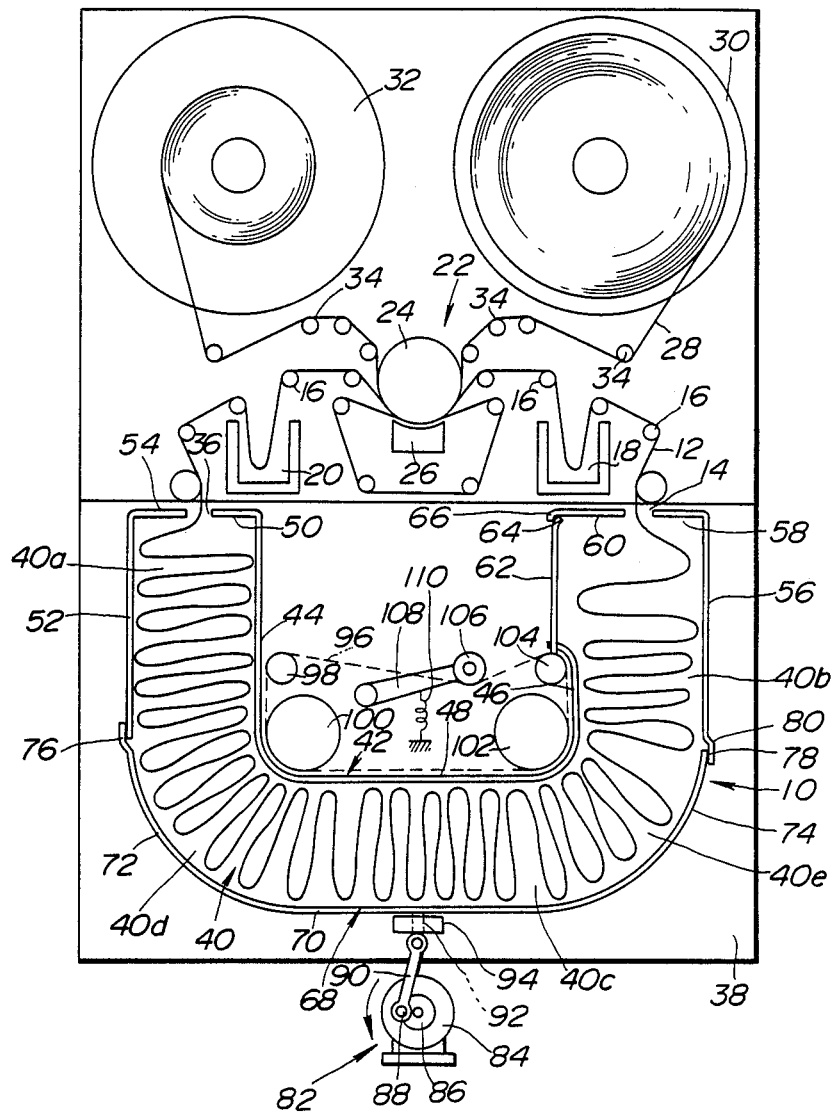
FIG. 1 is a front elevation of the preferred embodiment of a recorded tape duplicator system employing an endless master tape which is stored in the preferred embodiment of an endless tape storage apparatus, according to the invention.

Referring now to the drawings, particularly to FIG. 1, the preferred embodiment of a recorded tape duplicator system according to the present invention is a vertical type duplicator system which is arranged on a vertical base. The duplicator system employs the first embodiment of a tape storage apparatus 10 which stores an endless master tape 12 which stores signal or data, such as video and/or audio signals in a reversed form. As is well known, the master tape is prepared by duplicating signal or data in the reversed form from a mother tape through a per se known process. Of course, it would be possible to perform duplication from the mother tape to a master tape or master tapes by means of the shown embodiment of the duplicator system. The endless master tape is extracted through an outlet 14 of the tape storage apparatus 10 and transferred through a master tape path defined by a plurality of guides 16 through air tensioner devices 18 and 20 and through a data transfer section 22. A duplicator drum 24 and a magnetic duplicator head 26 are provided at the data transfer section 22 for printing data stored on the master tape 12 on a blank slave tape 28 which is transferred from a supply reel 30 to a take-up reel 32 through a slave tape path defined by a plurality of guides 34. The master tape 12 and the slave tape 28 mate each other at a data recording surface and at the data transfer section 22. The master tape 12 and the slave tape 28 are kept in contact with each other and wrapped onto the periphery of the duplicator drum 24 together.

A magnetic field is then formed around the data transfer section 22 by means of the magnetic duplicator head 26 to print the data stored on the master tape 12 to the slave tape 28. The slave tape which has passed the data transfer section 22 is wound on the take-up reel 32. On the other hand, the master tape 12 which has passed the data transfer section 22 is transferred into the tape storage apparatus 10 via an inlet 36.

The tape storage apparatus 10 employed in the shown embodiment has a vertically extending front plate which is removed for showing the inside of the tape storage apparatus for the purpose of illustration and is thus not shown on FIG. 1, and a vertically extending back plate 38 which extends substantially in parallel to the front plate with a given clearance therebetween. The clearance between the front plate and the back plate 38 is selected to be slightly wider than the transverse width of the master tape 12 to be stored in the tape storage apparatus 10. Between the front and back plates, an essentially U-shaped tape storage chamber 40 is defined. The tape storage chamber 40 has an inlet side vertical section 40a, an outlet side vertical section 40b and a horizontal section 40c extending between both vertical sections 40a and 40b. The joining sections 40d between the inlet side vertical section 40a and the horizontal section 40c and the joining section 40e between the horizontal section 40c and the outlet side vertical section 40b are curved with a radius large enough to smoothly transfer the master tape 12 therethrough. The inlet side vertical section 40a communicates with the inlet 36 to receive the master tape transferred through the data transferring section 22. Similarly, the outlet side vertical section 40b communicates with the outlet 14 to feed the master tape stored in the tape storage chamber 40 therethrough. Therefore, the master tape 12 fed into the tape storage chamber 40 is transferred through the inlet side vertical section 40a, the curved joining section 40d, the horizontal section 40c, the curved joining section 40e and the outlet side vertical section 40b.

In order to define the U-shaped tape storage chamber 40, stationary wall members 42 are disposed between the front and rear plates. The stationary wall member 42 has a longer vertical section 44, a shorter vertical section 46 and a horizontal section which respectively extend to define one side wall of the tape storage chamber 40. A horizontal bent section 50 of the stationary wall member 42 constitutes part of the upper end wall of the inlet side vertical section 40a of the tape storage chamber 40. An upper end of the shorter vertical section 46 is curved in a direction outward of the outlet side vertical section 40b.

A stationary wall member 52 is also disposed between the front and back plates in essentially a parallel relationship with the longer vertical section 44 of the stationary wall member 42. The top end portion 54 of the stationary wall member 52 is bent toward the horizontally bent section 50 of the stationary wall member to cooperate therewith to form the inlet side upper end wall. The inlet 36 is defined between the mating edges of the horizontally bent section 50 and the top end portion 54. Therefore, the inlet side vertical section 40a of the tape storage chamber 40 is defined between the longer vertical section 44 of the stationary wall member 42 and the stationary wall member 52.

Similarly, a stationary wall member 56 extends along the outlet side vertical section 40b of the tape storage chamber 40 to form the periphery thereof. The stationary wall member 56 has a horizontally bent section 58. The horizontally bent section 58 is cooperative with a horizontally extending stationary wall member 60 to form the outlet side upper end wall which defines the outlet 14 of the master tape. A tape initial set control plate 62 which is movable along the stationary wall member 42, is normally placed substantially in alignment of the shorter vertical section of the stationary member 42 so as to form part of the periphery of the outlet side vertical section 40b of the tape storage chamber 40. The upper end 64 of the tape initial set control plate 62 is in contact with a stopper portion 66 of the horizontally extending wall member 60 so as to be retained at the position aligned with the shorter vertical section 46 of the stationary wall member 42.

An oscillatable wall member 68 is provided for defining one of the periphery of the horizontal section 40c and the joining sections 40d and 40e. Therefore, the oscillatable wall member 68 has a horizontally extending section 70 which extends in parallel to the horizontally extending section 48 of the stationary wall member 42. The horizontally extending section 70 of the oscillable wall member 68 resides below the horizontally extending section 48 so that it may constitute the bottom of the tape storage chamber 40. Both end sections 72 and 74 are curved along the lower periphery of the curved joining sections 40d and 40e of the tape storage chamber 40. An upper end 76 of the section 72 is bent outwardly to form an overlapping with the lower end of the stationary wall member 52. On the other hand, the upper end 78 of the section 74 overlaps with the outwardly extending portion 80 of the lower end of the stationary wall member 56.

The oscillatable wall member 68 is drivingly associated with a drive device 82 at about the center thereof. The drive device 82 comprises a drive motor 84. An eccentric cam disc 86 is secured on the output shaft of the motor 84. The eccentric cam disc 86 carries an eccentric pin 88 projected from one surface of the eccentric cam disc 86 at a position offset from the center of the cam disc. To the eccentric pin 88, a drive link 90 is engaged. The other end of the drive link 90 engages with an actuation rod 92 which extends through a guide 94 for vertical thrusting movement as driven by the drive motor 84. The upper end of the actuation rod 92 is connected to the oscillatable wall member 68 so as to transfer vertical oscillation energy which is converted from the rotational energy of the drive motor, to the oscillatable wall member. Therefore, the oscillatable wall member 68 is driven to oscillate.

Since the oscillatable wall member 68 constitutes the bottom of the tape storage chamber 40 and thus the tape accumulated in the tape storage chamber, especially within the horizontal section 40c, normally contacts with the oscillatable wall, the oscillation or vibration of the oscillatable wall member is transmitted to the tape to causing jumping of the tape within the tape storage chamber. For the tape accumulated in the horizontal section 40c of the tape storage chamber 40, a feeding force to feed the tape toward the outlet 14 is exerted due to the gravity weight of the continuously introduced tape through the inlet 36. The vertical force to be exerted on the tape in the inlet side vertical section 40a is converted into a horizontal force through the curved inlet side joining section 40d and transmitted through the tape in the inlet side joining section. In cooperation with the oscillation energy transmitted through the oscillable wall member 68 which causes jumping of the tape in the horizontal section, this horizontal force serves for transferring the tape in the horizontal section 40c toward the outlet 14. Therefore, every time the tape jumps, the tape in the horizontal section 40c is fed toward the outlet side joining section 40e.

On the other hand, in the outlet side vertical section 40b, the tape receives a downward force due to its own gravity weight, which downward force serves as resistance against transferring of the tape toward the outlet 14. Against this downward force, an upward force is exerted on the tape in the outlet side vertical section 40b, which upward force is converted from a horizontal force to the vertical force by the outlet side joining section 40e and transferred through the tape in the outlet side joining section. This upward force is cooperative with the drawing force to extract the tape from the tape storage chamber 40 to feed through the master tape path.

Since the jumping of the tape in the horizontal section 40c substantially reduces resistance against movement of the tape toward the outlet 14, the substantially static load applied to the tape by the weight of the tape in the inlet side vertical section 40a can be effectively used as a force to transfer the tape. This accomplishes a smooth transfer of the tape through the tape storage chamber 40. By smooth transfer, an excessive folding force by accumulation of the tape in the horizontal section and/or the outlet side vertical section may not be exerted on the tape. This successfully avoids a possibility of formation of folding wrinkles on the tape which may cause drop-out or disturbance of the recorded information. Also, such smooth transfer of the tape through the tape storage chamber may avoid a possibility of breakage of the tape during a duplicating operation due to excessive tension to be exerted on the tape when jamming the tape in the tape storage chamber, since the preferred embodiment of the tape storage apparatus can regularly transfer the in synchronism with oscillation of the oscillable wall member 68. Furthermore, a smooth transfer of the tape allows a high speed feed of the master tape 12 through the master tape path to allow high speed duplicating operation. This clearly aids improvement of the efficiency of the duplicator operations.

It will be appreciated that it would be preferable to determine the oscillation frequency and oscillation magnitude of the oscillable wall member depending upon the desired tape feed speed through the master tape path. In the preferred embodiment, the preferred oscillation frequency range is about 10 to 100 cycles per second and the preferred oscillation magnitude is about 0.5 to 4 mm.

In the shown embodiment of the tape storage apparatus, it is essential to regularly set the master tape 12 in the tape storage chamber 40 upon initial set, in order to establish smooth transfer of the tape. a process of initially setting the tape in the tape storage apparatus in the shown embodiment will be discussed herebelow with reference to FIGS. 2 to 4.

FIG. 2 shows the initial position of the a initial set control plate 62 upon starting initial tape set. The initial set control plate 62 is placed at the shown position of FIG. 2 and is driven along the stationary wall member 42 by an initial setting control plate drive mechanism. The drive mechanism comprises a drive chain 96 to which the initial setting control plate 62 is cooperated to be driven according to its movement The drive chain is wound around driving sprocket 98 and guide sprockets 100, 102 and 104. The driving sprocket 98 may be associated with a manual drive means or a driving motor for driving the chain to circulate the chain in a counterclockwise direction in FIGS. 1 to 4. A tension adjusting sprocket 106 also engages with the chain. The tension adjusting sprocket 106 is supported on a pivotal lever 108 which is normally biased in a clockwise direction in FIGS. 1 to 4, by means of a tension control spring 110.

Figure 4:
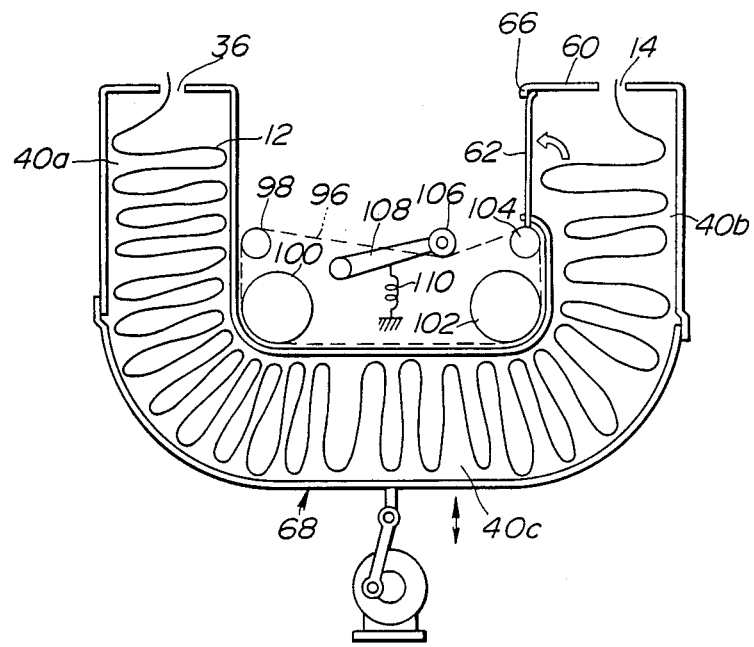

As driven by the drive mechanism as set forth above, the initial setting control plate 62 moves to the position of FIGS. 1 and 4 through the position of FIG. 3. The speed of movement of the initial setting control plate 62 is so adjusted as to synchronize with the speed of introduction of the tape through the inlet 36. Preferably, the speed of the movement of the initial setting control plate 62 is so adjusted as to provide resistance against the tape introduced into the tape storage chamber for regularly folding the tape.

Figure 5:
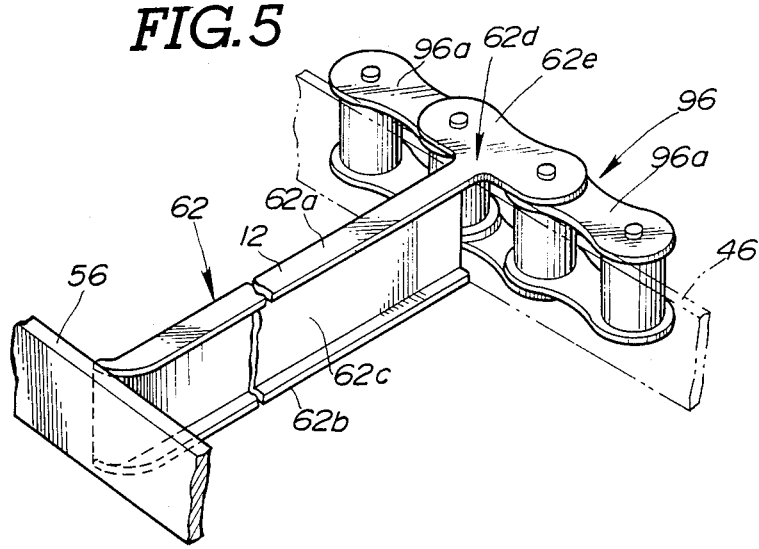
FIG. 5 is a perspective view of an initial set control plate employed in the preferred embodiment of the tape storage apparatus.

FIG. 5 shows one of the preferred constructions of the initial setting control plate 62. The initial setting control a plate 62 has flange sections 62a and 62b and a plate section 62c extending between the upper and lower flange sections. The flange section 62a lies on a plane frontwardly offset from the plane extending through the front edge of the stationary wall member 42 or rearwardly offset from the plane extending through the rear edge of the stationary wall member. The flange 62a has an extension 62d transversely extending over the associated front or rear edge of the stationary wall member 42. The free end 62e is so configured as to match with the side, plate 96a of the chain 96 to form one of the part of a sequence of chain. Therefore, the initial setting control plate 62 is driven by the chain according to circulation of the chain.

As seen from FIGS. 1 and 4, at the end of the initially setting motion, the initial setting control plate 62 is placed parallel to the vertical section 46 of the stationary wall member 42. At this position, the free end 64 of the initial setting control plate 62 comes into contact with the stopper portion 66 of the horizontally extending wall member 60. At the same time, the drive mechanism may stop driving. In case that the drive motor is employed for driving the driving sprocket 98, a limit switch may be provided to detect the initial setting control plate 62 at the position of FIGS. 1 and 4 to stop the drive motor.

By the effect of the initial setting control plate 62, the master tape 12 can be set in the tape storage apparatus in regularly folded fashion. This apparently assists smooth transfer of the tape through the tape storage apparatus. Furthermore, since the tape is regularly folded in the tape storage apparatus, jamming in the tape storage chamber can be successfully prevented.

FIGS. 6 to 12 show the second embodiment of a recorded tape duplicator system with a tape storage apparatus according to the invention. As seen from FIG. 6, this embodiment is applied for the system, in which a master tape 112 runs on a horizontal plane. The master tape 112 is stored in a horizontally lying tape storage apparatus 114. The master tape 112 is extracted from the tape storage apparatus 114 through an outlet 116 to be fed through a master tape path 118 extending on a duplicator base 120 which is supported by a duplicator housing 122. A supply reel 124 around which a slave tape 126 is wound is mounted on the duplicator base 120 for supplying the blank slave tape. The slave tape 126 is fed through a slave tape path 128 and wound around a tape-up reel 130.

The master tape path 118 and the slave tape path 128 meet at a data transfer section 132 where a duplicator drum 134 and a magnetic duplicator head 136 are provided. Air tension adjusters 138 and 140 and capstans 142 and 144 are provided in the master tape path 118. The air tension adjusters 138 and 140 are provided for automatically adjusting the tension running through the master tape path 118. Air tension adjusters 146 and 148 are also provided in the slave tape path 128 for automatically adjusting the tension on the slave tape running through the slave tape path 128.

The master tape 112 fed through the master tape path 118 is introduced into a tape storage chamber 150 in the tape storage apparatus 114 through an inlet 152. The master tape 112 is in the endless form and thus continuously transferred through the tape storage chamber 150 and the master tape path 118 repeatedly.

Figure 6:
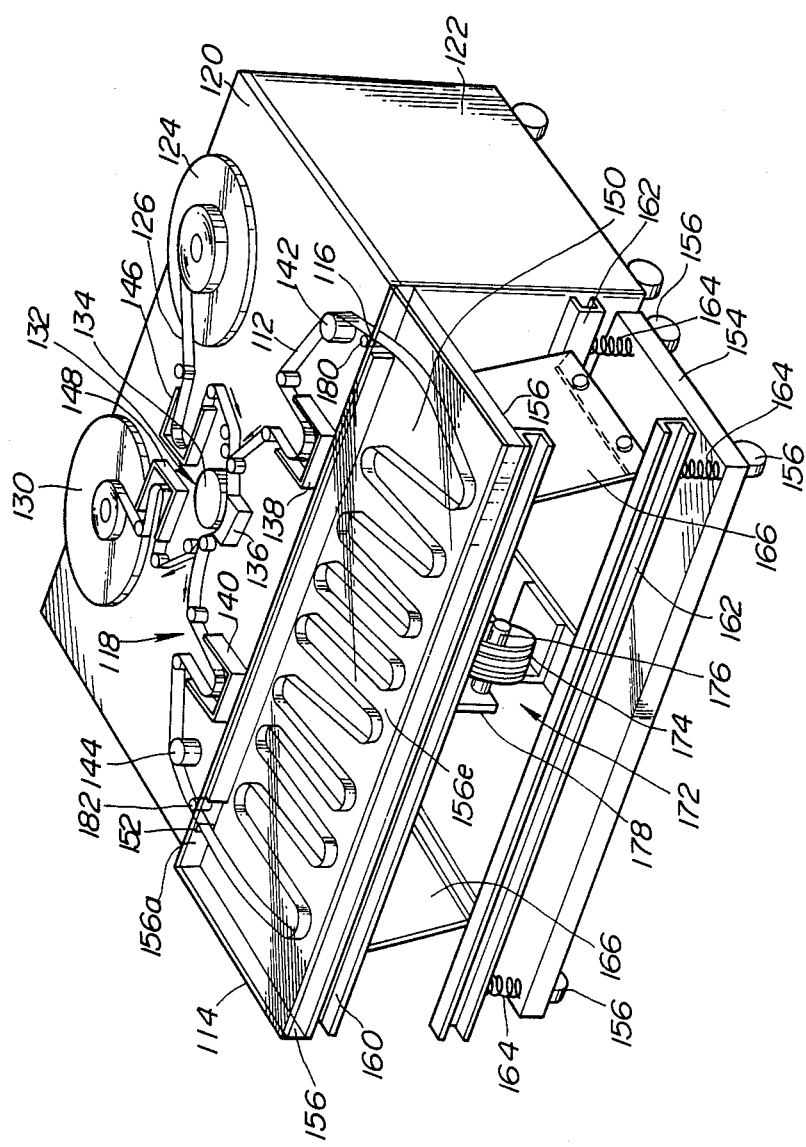
FIG. 6 is a perspective view of the second embodiment of a recorded tape duplicator system, in which another embodiment of a tape storage apparatus is employed.

As seen from FIG. 6, the tape storage apparatus is mounted on a movable base frame 154 with casters 156. The tape storage apparatus 114 has a tape storage casing 158 in an essentially rectangular thin box shaped configuration, which tape storage casing 156 defines therein the tape storage chamber 150 in a substantially rectangular box shaped configuration. The tape storage casing 156 has front wall 156a extending vertically and located adjacent the recorded duplicator system. The front wall 156a defines the outlet 116 and the inlet 152. Side walls 156b and 156c extend perpendicularly from both ends of the front wall 156a. Back plate 156d extends in parallel to the front wall and between the rear ends of the side walls. Upper and lower plates 156e and 156f cover both upper and lower ends of the tape storage casing to define a substantially enclosed space as the tape storage chamber 150. In the preferred construction, the upper plate 156e is formed of a transparent material so that the inside of the tape storage chamber 150 can be seen therethrough.

Channel members 160 are secured on the lower surface of the lower plate 156f. Another pair of channel members 162 extends in a substantially parallel relationship to the channel members 160. The channel members 162 are resiliently supported by means of a support spring 164 which extends from the upper surface of the movable base frame 154. Leaf springs 166 are interposed between the channels 160 and 162. Transverse channel members 168 and 170 are fixed to upper and lower ends of the leaf springs 166. Through the upper transverse channel members 168, the leaf springs 166 are connected to the channel members 160. On the other hand, the lower end of the leaf spring 166 are connected to the channel members 162 through the lower transverse channel members 170.

Figure 7:
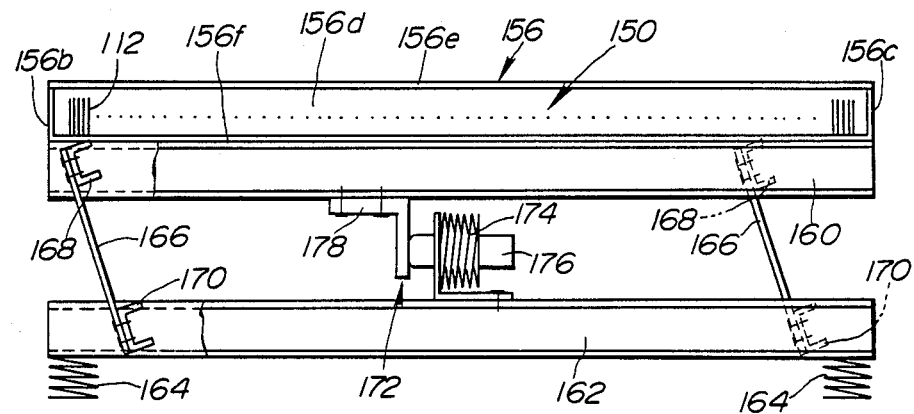
FIG. 7 is a front elevation of the second embodiment of the recorded tape duplicator system with the tape storage apparatus of FIG. 6.

As clearly seen from FIG. 7, the leaf springs 166 are inclined by offsetting the connecting point of the lower ends thereof toward the outlet side relative to the connecting point of the upper end. With this arrangement of the leaf springs 166, the resilient force which may be accumulated when the leaf springs 166 are deformed, is converted to the energy for transferring the tape in the tape storage chamber 150 from the inlet 152 to the outlet.

So as to cause deformation of the leaf springs 166, an actuator assembly 172 is provided beneath the tape storage casing 156. The actuator assembly 172 comprises an electromagnetic actuator 174 with an actuation rod 176 and a york plate 178. The york plate 178 is rigidly secured onto the lower surface of the lower plate 162f and having a vertical surface opposing the end of the actuator rod 176 so as to be depressed when the electromagnetic actuator 174 is energized. The york plate 178 is driven to be shifted toward left in FIG. 7 to cause deformation of the leaf springs 166 as shown by phantom line 166' in FIG. 8, while the electromagnetic actuator 174 is energized. On the other hand, upon deenergization of the electromagnetic actuator 172 causes releasing of the depression force to be exerted on the york 178. By releasing of the depression force, the leaf spring 166 resiliently return to the initial position.

Figure 8:
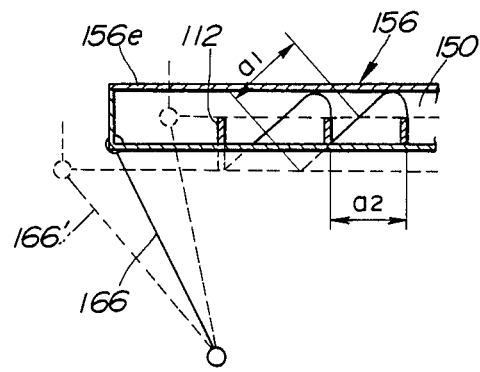
FIG. 8 is an explanatory illustration showing manner of transferring of the tape in the tape storage apparatus of FIG. 6.

As seen from FIG. 8, the resilient force of the leaf springs 166 upon returning to the initial position is exerted to the tape in the tape storage chamber 150 through the lower plate 162f. The force is directed obliquely to include vertical and horizontal components. The horizontal component of the resilient force F may serve as a force to transfer the tape toward the outlet 116.

The pitch $a_2$ of transferring of the tape in the tape storage chamber 150 is determined according to magnitude of the resilient force to be exerted on to the tape when the leaf springs 166 resiliently return to the initial position. For example, when the endless master tape 112 of 300 m length is driven at a speed about 5 m/sec. in the duplicator system, and when the distance between the outlet 116 and the inlet 152 is 1.5 m, a tape transfer speed of about 25 mm/sec. is required for establishing synchronization to the tape feed speed in the master tape path. If magnitude $a_1$ of motion of the upper end of the leaf spring 166 is 0.5 mm, and thus the tape transfer pitch $a_2$ is also about 0.5 mm, the energization and deenergization frequency of the electromagnetic actuator 174 becomes about 50 Hz. Therefore, with the shown arrangement, by applying the drive current of 50 Hz to the electromagnetic actuator 174, the required tape transfer speed of 25 mm/sec. can be obtained. On the other hand, when the endless tape of 150 m length is used in the identical conditions, required tape transfer speed becomes about 50 mm/sec. Therefore, in this case, the electromagnetic actuator 174 has to be driven at a frequency about 100 Hz.

Therefore, as will be appreciated herefrom, the tape transfer speed in the tape storage chamber may be adjusted by adjusting the magnitude $a_1$ of deformation of the leaf spring 166 and the energization frequency of the electromagnetic actuator 174. Therefore, the actuator rod stroke and the energization frequency of the electromagnetic actuator may be controlled in view of the tape feed speed in the duplicator system.

On the preferred construction, air nozzles 180 and 182 are provided on the duplicator base 120 adjacent the outlet 116 and the inlet 152 of the tape storage chamber 150. The air nozzles 180 and 182 are so designed as to discharge air parallel to the tape feed direction. As shown in FIGS. 9 to 12, the air nozzle 180 directs the air flow toward the tape adjacent the outlet 116 so as to make the tape to be extracted from the tape storage chamber 150 substantially straight so that the tape may be smoothly extracted through the outlet. On the other hand, the air nozzle 182 is directed to the inlet 152 to exert the force for feeding the newly introduced tape toward the rear end of the tape storage chamber.

Figure 9:
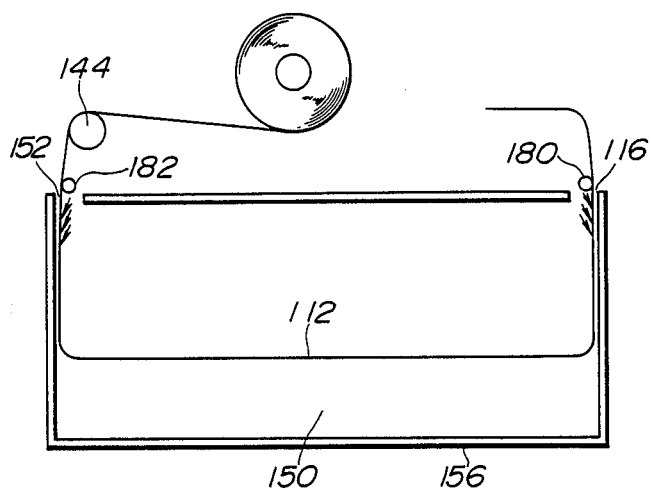
FIGS. 9 to 12 are partial plane views of the tape storage apparatus employed in the second embodiment the recorded tape duplicator system of FIG. 6, which show the process of initially setting an endless tape in the tape storage apparatus.
Figure 10:
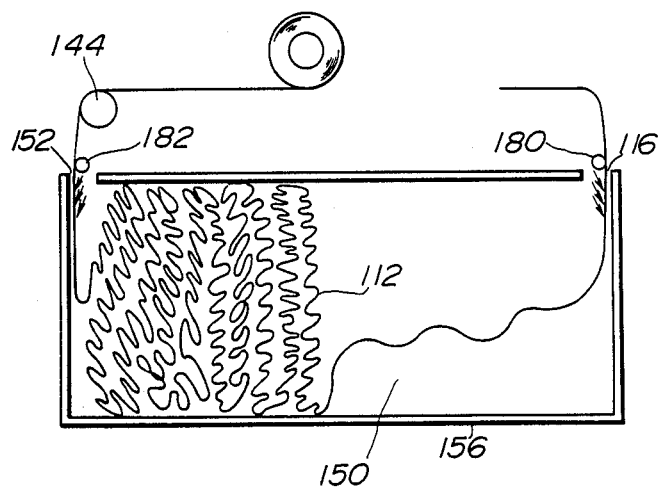
Figure 11:
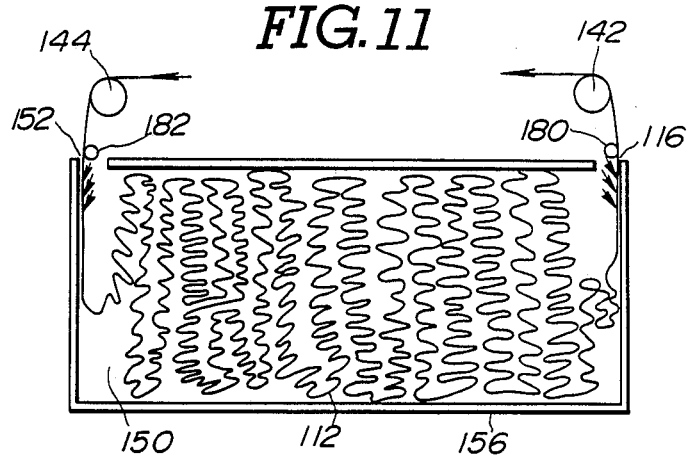
Figure 12:
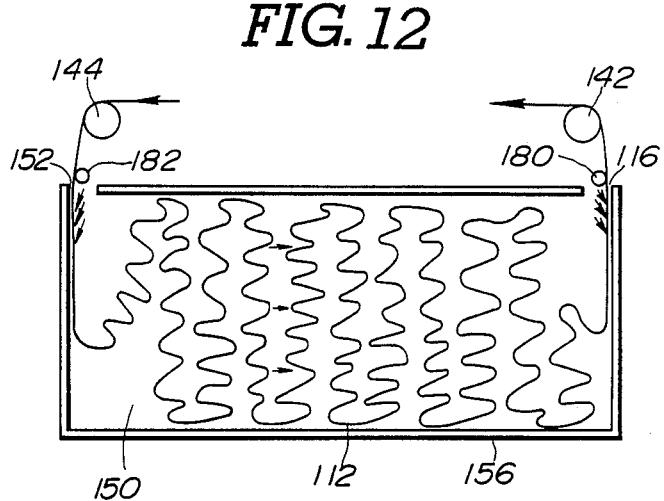

FIGS. 9 through 11 show a process of initially setting the master tape 112 in the tape storage chamber 150. The predetermined length of the master tape is, at first formed into an open-ended form to pass the tape storage chamber 150. After this, while holding one end taken out from the outlet 116, an extra length of the tape is introduced into the tape storage chamber while shaking or oscillating the tape storage casing by operation of the actuator assembly 172. As shown in FIGS. 10 and 11, the tape introduced into the tape storage chamber 150 is gradually fed toward the outlet. At the initial setting completed condition, the tape in the tape storage chamber 150 is in a form as shown in FIG. 11. If the length of the endless master tape to be used is relatively short, the initially set form of the tape in the tape storage chamber 150 becomes in a form as shown in FIG. 12. Even for the initially setting of the tape, the shown embodiment of the tape storage apparatus is effective by exerting shaking or oscillation energy containing a component serving for feeding the tape toward the outlet.

This may assist for initially setting the tape in the tape storage chamber with a regularly folded pattern.

Figure 13:
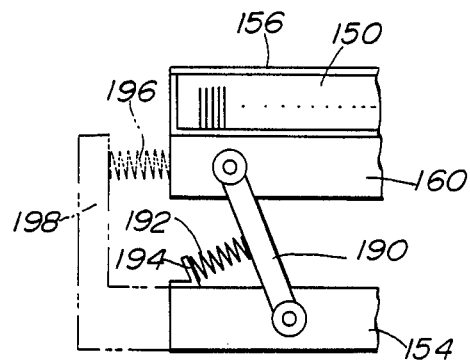
FIG. 13 is a partial front elevation of the major section of a modification of the second embodiment of the tape storage apparatus of FIGS. 6 and 7.
Figure 14:
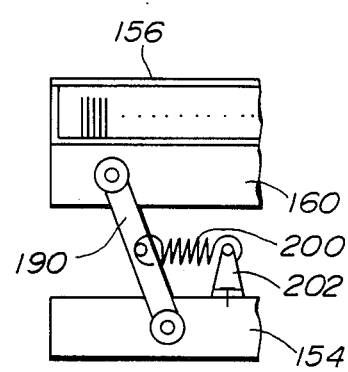
FIG. 14 is a partial front elevation of another modification of the tape storage apparatus of FIGS. 6 and 7.

FIGS. 13 and 14 show modifications of the foregoing second embodiment of the tape storage apparatus according to the invention. In the modifications of FIGS. 13 and 14, the leaf springs 166 are replaced with rigid link levers 190. In the embodiment of the modification of FIG. 13, the resilient force may be produced by a compression spring 192 connected to the rigid link lever 190 at one end and connected to the movable base 154 via a bracket 194. Another compression spring 196 may be provided between a lateral side of the tape storage casing 156 and a vertical wall section 198 extending from the movable base. With the shown modification, the resilient force including the horizontal component may be created by the compression springs 192 and 196 for transferring the tape in the tape storage chamber 150 toward the outlet.

Though the shown embodiment employs two compression springs for creating the resilient force to feed the tape, it would be possible to formulate the tape storage apparatus with either one of the compression springs.

On the other hand, in the modification of FIG. 14, a tension spring 200 is employed for creating the resilient force to feed the tape in the tape storage chamber. In this case, one end of the tension spring 200 is connected to the rigid link lever 190. The other end of the tension spring 200 is connected to a bracket 202 extending from the movable base 154. The tension spring 200 is arranged to accumulate the tension energy while the tape storage casing is driven at the shifted position by means of the actuation assembly of FIG. 6.

As will be appreciated, the second embodiment of the tape storage apparatus of the present invention can establish a smooth transfer of the tape in the tape storage chamber and thus assist for high speed operation of the tape duplicator system.

Though the shown embodiments have been directed to the recorded tape duplicator system for producing duplicated tapes, such as duplicated video tapes, the storage apparatus according to the invention may be applicable for storing elongated flexible strips, such as movie film, punched tape, and so forth. Therefore, the storage apparatus should not be appreciated to be limited to the shown embodiments.

Furthermore, while the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A storage apparatus for an elongated strip comprising:
   a casing defining a chamber for storing said elongated strip, said chamber extending between an inlet through which said elongated strip is introduced and an outlet through which said elongated strip is fed out;
   externally provided means for externally driving at least a part of said casing to oscillate; and
   means for defining a direction of said oscillation on at least said part of said casing for exerting a feeding force on said elongated strip for transferring said elongated strip from said inlet to outlet.

2. A storage apparatus as set forth in claim 1, wherein said chamber has a length substantially shorted than the length of said elongated strip and designed for storing said extra length of elongated strip in folded fashion.

3. A storage apparatus for an elongated strip comprising:
   a casing defining a chamber for storing said elongated strip, said chamber extending between an inlet through which said elongated strip is introduced and an outlet through which said elongated strip is fed out, wherein said casing defines said chamber including a first section oriented adjacent said inlet and for transferring said elongated strip in a first direction parallel to the direction along which said elongated strip is introduced, a second section oriented adjacent said outlet and for transferring said elongated strip in a second direction parallel to the direction along which said elongated strip is fed out, and a third section connecting said first and second sections for transferring said elongated strip from the first end adjacent said first section to the second end adjacent said second section;
   means for driving at least a part of said casing to oscillate; and
   means for exerting a feeding force on said elongated strip for transferring said elongated strip from said inlet to outlet and said feeding force exerting means is active for exerting the feeding force in a third direction substantially along said third section for transferring said elongated strip in said third section from said first end to said second end.

4. A storage apparatus as set forth in claim 3, wherein said casing is provided on a vertical plane, and said first transfer direction is vertically downward to transfer said elongated strip vertically introduced through said inlet, said second transfer direction is vertically upward to upwardly feed out through said outlet and said third transfer direction is horizontal to transfer said elongated strip from said first end to said second end in synchronism with a vibration cycle.

5. A storage apparatus as set forth in claim 4, wherein said casing has a oscillatable wall member constituting a bottom of said third section, said oscillatable wall member being designed to be driven for vibration to cause vertical shaking of said elongated strip in said third section to cause movement from said first end to said second end in the aid of gravity weight of the strip in said first section.

6. A storage apparatus as set forth in claim 5, which further comprises means, initially arranged in said chamber adjacent said inlet, for restricting movement of said elongated strip upon initially setting said elongated strip in said chamber, said elongated strip movement restricting means being movable along the center axis of said chamber in synchronism with introduction of said elongated strip for folding the strip in said chamber in a pleated fashion.

7. A storage apparatus as set forth in claim 6, wherein said elongated strip movement restricting means is movable along said initial position to an end position where it is placed adjacent said outlet along said center axis of said chamber, said elongated strip movement restricting means being associated with a driving means for movement in synchronism with introduction of said elongated strip into said chamber.

8. A storage apparatus as set forth in claim 7, wherein said elongated strip movement restricting means comprises a plate member initially extending in perpendicular to said center axis of said chamber for restricting movement of said elongated strip and being placed in parallel to said center axis of said chamber at said end position for allowing said elongated strip to pass through said outlet.

9. A storage apparatus as set forth in claim 3, wherein said feeding force exerting means converts the gravital weight of said elongated strip in said first section into said feeding force for transferring said elongated strip in said third section from said first end to said second end.

10. A storage apparatus as set forth in claim 3, wherein said first, second and third sections are oriented on a horizontal plane.

11. A storage apparatus as set forth in claim 10, wherein said feeding force exerting means converts vibration energy into feeding force for transferring elongated strip in said third section from said first end to said second end.

12. A storage apparatus as set forth in claim 10, wherein said driving means driving said casing to exert vibration energy on said elongated strip directed in a direction oblique to said horizontal plane, the direction of said vibration energy being so selected as to include a horizontal component directed to feed said elongated strip from said first end to said second end in said third section.

13. A storage apparatus as set forth in claim 12, which further comprises means, provided adjacent said inlet and said outlet for discharging air toward said elongated strip for maintaining strip in straight during travel through said first and second sections of said chamber.

14. A storage apparatus as set forth in claim 3, wherein said elongated strip forms an endless loop circulating through a predetermined external path and continuously drawn out through said outlet of said chamber and recirculated into said chamber through said inlet.

15. A storage apparatus as set forth in claim 14, wherein said chamber has a length substantially shorter than the length of said endless-form elongated strip and designed for storing said extra length of elongated strip in a pleated fashion.

16. A storage apparatus as set forth in claim 15, wherein said casing defines said chamber including a first section oriented adjacent said inlet and for transferring said elongated strip in a first direction parallel to the direction along which said elongated strip is introduced, a second section oriented adjacent said outlet and for transferring said elongated strip in a second direction parallel to the direction along which said elongated strip is fed out, and a third section connecting said first and second section for transferring said elongated strip from the first end adjacent said first section to the second end adjacent said second section, and said feeding force exerting means is active for exerting feeding force on said elongated strip in said third section in a third direction substantially along said third section for transferring said elongated strip in said third section from said first end to said second end.

17. A tape duplicating system for duplicating information recorded on an endless form master tape to a continuously fed blank tape, comprising:
first means for defining a first path through which said master tape is circulated;
second means for defining a second path through which said slave tape is fed, said second path including an information transfer section at which said slave tape mates with said master tape;
third means, active at said information transfer section, for duplicating information recorded on said mater tape to said slave tape;
a tape storage apparatus disposed within said first path for storing an extra length of an endless master tape, which comprises;
a casing defining a chamber for storing said tape, said chamber extending between an inlet through said tape is introduced and an outlet through which said tape is fed out;
externally provided means for externally driving at least a part of said casing to oscillate; and
means for defining a direction of said oscillation on at least a part of said casing for exerting a feeding force on said elongated strip for transferring said elongated strip from said inlet to outlet.

18. A tape duplicator system as set forth in claim 17, wherein said chamber has a length substantially shorted than the length of said tape and designed for storing said extra length of tape in folded fashion.

19. A tape duplicating system for duplicating information recorded on an endless form from a master tape to a continuously fed blank tape, comprising:
first means for defining a first path through which said master tape is circulated;
second means for defining a second path through which said slave tape is fed, said second path including an information transfer section at which said slave tape mates with said master tape;
third means, active at said information transfer section, for duplicating information recorded on said mater tape to said slave tape;
a tape storage apparatus disposed within said first path for storing an extra length of an endless master tape, which comprises;
a casing defining a chamber for storing said tape, said chamber extending between an inlet through which said tape is introduced and an outlet through which said tape is fed out, wherein said casing defines said chamber including a first section oriented adjacent said inlet and for transferring said tape in a first direction parallel to the direction along which said tape is introduced, a second section oriented adjacent said outlet and for transferring said tape in a second direction parallel to the direction along which said tape is fed out, and a third section connecting said first and second section for transferring said tape from the first end adjacent said first section to the second end adjacent said second section, and said feeding force exerting means is active for exerting the feeding force on said tape in said third section in a third direction substantially along said third section for transferring said tape in said third section from said first end to said second end;
means for driving at least a part of said casing to oscillate; and
means for exerting a feeding force on said tape for transferring said tape from said inlet to outlet.

20. A tape duplicator system as set forth in claim 19, wherein said casing is provided on a vertical plane, and said first transfer direction is vertically downward to transfer said elongated strip vertically introduced through said inlet, said second transfer direction is vertically upward to upwardly feed out through said outlet and said third transfer direction is horizontal to transfer said elongated strip from said first end to said second end in synchronism with vibration cycle.

21. A tape duplicator system as set forth in claim 20, wherein said casing has a oscillatable wall member constituting a bottom of said third section, said oscillatable wall member being designed to be driven for vibration to cause vertical shaking of said elongated strip in said third section to cause movement from said first end to said second end in the aid of gravity weight of the strip in said first section.

22. A tape duplicator system as set forth in claim 21, which further comprises means, initially arranged in said chamber adjacent said inlet, for restricting movement of said elongated strip upon initially setting said elongated strip in said chamber, said elongated strip movement restricting means being movable along the center axis of said chamber in synchronism with introduction of said elongated strip for folding the strip in said chamber in pleated fashion.

23. A tape duplicator system as set forth in claim 22, wherein said elongated strip movement restricting means is movable along said initial position to an end position where it is placed adjacent said outlet along said center axis of said chamber, said elongated strip movement restricting means being associated with a driving means for movement in synchronism with introduction of said elongated strip into said chamber.

24. A tape duplicator system as set forth in claim 23, wherein said tape movement restricting means comprises a plate member initially extending in perpendicular to said center axis of said chamber for restricting movement of said tape and being placed in parallel to said center axis of said chamber at said end position for allowing said tape to pass through said outlet.

25. A tape duplicator system as set forth in claim 19, wherein said feeding force exerting means converts the gravital weight of said elongated strip in said first section into said feeding force for transferring said elongated strip in said third section from said first end to said second end.

26. A tape duplicator system as set forth in claim 19, wherein said first second and third sections of said chamber are oriented on a horizontal plane.

27. A tape duplicator system as set forth in claim 26, wherein said driving means driving said casing to exert vibration energy on said tape directed in a direction oblique to said horizontal plane, the direction of said vibration energy being so selected as to include a horizontal component directed to feed said tape from said first end to said second end in said third section.

28. A tape duplicator system as set forth in claim 27, which further comprises means, provided adjacent said inlet and said outlet for discharging air toward said tape for maintaining a strip in a straight orientation during travel through said first and second sections of said chamber.

29. A tape duplicator system as set forth in claim 26, wherein said feeding force exerting means converts vibration energy into feeding force for transferring an elongated strip in said third section from said first end to said second end.

30. A tape duplicator system as set forth in claim 19, wherein said tape forms an endless loop circulating through a predetermined external path and continuously drawn out through said outlet of said chamber and recirculated into said chamber through said inlet.

31. A tape duplicator system as set forth in claim 30, wherein said chamber has a length substantially shorter than the length of said endless-form tape and designed for storing said extra length of tape in pleated fashion.

32. A tape duplicator system as set forth in claim 31, wherein said casing defines said chamber including a first section oriented adjacent said inlet and for transferring said tape in a first direction parallel to the direction along which said tape is introduced, a second section oriented adjacent said outlet and for transferring said tape in a second direction parallel to the direction along which said tape is fed out, and a third section connecting said first and second section for transferring said tape from the first end adjacent said first section to the second end adjacent said second section, and said feeding force exerting means is active for exerting feeding force to said tape in said third section in a third direction substantially along said third section for transferring said tape in said third section from said first end to said second end.

33. A storage apparatus as set forth in claim 1, wherein said elongated strip forms an endless loop circulating through a predetermined external path and continuously drawn out through said outlet of said chamber and recirculated into said chamber through said inlet.

34. A tape duplicator system as set forth in claim 17, wherein said tape forms an endless loop circulating through a predetermined external path and continuously drawn out through said outlet of said chamber and recirculated into said chamber through said inlet.

* * * * *